(12) United States Patent
Gopalakrishnan

(10) Patent No.: US 6,347,094 B1
(45) Date of Patent: Feb. 12, 2002

(54) DATA RATE SMOOTHING

(75) Inventor: Palamalai Gopalakrishnan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/119,835

(22) Filed: Jul. 21, 1998

(51) Int. Cl.$^7$ ................................................. H04J 3/16
(52) U.S. Cl. ........................ 370/464; 370/465; 370/468
(58) Field of Search ................................ 370/407, 464, 370/465, 468, 535; 375/240; 348/405

(56) References Cited

U.S. PATENT DOCUMENTS

| | | | | |
|---|---|---|---|---|
| 4,558,445 A | * | 12/1985 | Novick | ........................ 370/535 |
| 5,241,383 A | * | 8/1993 | Chen et al. | .................. 348/405 |
| 6,088,392 A | * | 7/2000 | Rosenberg | ................... 375/240 |
| 6,157,652 A | * | 12/2000 | Henson et al. | ............... 370/407 |

\* cited by examiner

*Primary Examiner*—Salvatore Cangialosi
(74) *Attorney, Agent, or Firm*—Lee & Hayes, PLLC

(57) ABSTRACT

Data rate smoothing is disclosed. In one embodiment, a system includes a real-time encoder and a rate-smoothing mechanism. The real-time encoder has a first layer and a second layer, where the first layer sends packets of data to the second layer at a dynamic bit rate. The mechanism adjusts the dynamic bit rate such that the rate is less than a predetermined maximum rate. In a further embodiment, the second layer also sends the packets to the mechanism, and the system also includes a buffer and a client. The buffer temporarily stores the packets received by the mechanism. The client receives the packets from the mechanism, where the mechanism deletes packets from the buffer when a predetermined backlog threshold is exceeded.

26 Claims, 3 Drawing Sheets

DATA RATE SMOOTHING

FIELD

This invention relates generally to the transmission and arrival of data, and more particularly to the smoothing of the data rate of such transmission and arrival of data.

BACKGROUND

The Internet has become an increasingly popular manner by which to convey information such as multimedia clips. One way for a user to download such clips from a remote server to be played on his or her (client) computer is known as streaming. With streaming technology, the user's computer requests that the server begin sending a stream of data thereto. As the stream of data is being received, it is played on the user's computer.

However, a disadvantage with streaming is that delays and data drop-out can occur throughout the streaming process, causing sub-optimal playback of the streamed data. For example, a server may be processing live audio and video events to be streamed to the client computer. The real-time encoding of such audio and video events into packets of data so that they may be streamed to the client computer typically occurs at what is known as an advertised data rate. The advertised rate is a contract between all cooperating components at the server computer to send data at a promised rate. However, at least some of the components may send data in bursts, such that the promised rate is actually an average rate over a given period of time. The burst rate may thus be ten or even a hundred percent over the advertised rate. If other components of the system cannot process the data at the burst rate, there is risk of data being lost, or "dropping out."

As another example, a remote server may know that the client computer receives data at a rate governed by a communication mechanism at the client. Modems are one type of such communication mechanisms, and are typically limited to data rates of 28,800, 36,600, or 53,000 bits-per-second (baud rate). However, these baud rates are maximum rates; data may be received by the client at much lower rates, as a result of, for example, sub-par telephone line quality. Thus, transmission of data from the server to the client may become delayed. This is especially disadvantageous in contexts of streaming live or "late breaking" events, such that delay renders the information that the client does receive from the server as less valuable, since it may not be current. For these and other reasons, there is a need for the present invention.

SUMMARY

The above-identified problems, shortcomings and disadvantages with the prior art, as well as other problems, shortcoming and disadvantages, are solved by the present invention, which will be understood by reading and studying the specification and the drawings. In one embodiment, a system includes a real-time encoder and a rate-smoothing mechanism. The real-time encoder has a first layer (e.g., an upper layer) and a second layer (e.g., a network layer), where the first layer sends packets of data to the second layer at a dynamic bit rate. The rate-smoothing mechanism adjusts the dynamic bit rate such that the rate is less than a predetermined maximum rate.

In a further embodiment of the invention, the second layer of the real-time encoder also sends the packets of data to the rate-smoothing mechanism. In this embodiment, the system also includes a buffer and a client. The buffer temporarily stores the packets of data received by the rate-smoothing mechanism from the second layer of the real-time encoder. The client receives the packets of data from the rate-smoothing mechanism as temporarily stored in the buffer, where the rate-smoothing mechanism deletes packets from the buffer when a predetermined backlog threshold is exceeded.

Thus, embodiments of the invention provides for advantages not found in the prior art. For example, data drop out during the real-time encoding of multimedia events is substantially eliminated. The rate-smoothing mechanism adjusts the dynamic bit rate so that the rate at which the second layer of the real-time encoder receives data from the first layer of the real-time encoder does not exceed a maximum rate at which the second layer can receive the data. As a further example, transmission delay of data from the server to the client is substantially accounted for. The rate-smoothing mechanism deletes packets from the buffer when a predetermined backlog threshold is exceed, so that the data is not overly old when it finally does reach the client.

The invention includes systems, methods, computers, and computer-readable media of varying scope. Besides the embodiments, advantages and aspects of the invention described here, the invention also includes other embodiments, advantages and aspects, as will become apparent by reading and studying the drawings and the following description.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. In the first section, the hardware and the operating environment in conjunction with which embodiments of the invention may be practiced are described. In the second section, a system of one embodiment of the invention is presented. In the third section, a method, in accordance with an embodiment of the invention, is provided. Finally, in the fifth section, a conclusion of the detailed description is provided.

Hardware and Operating Environment

Figure 1:
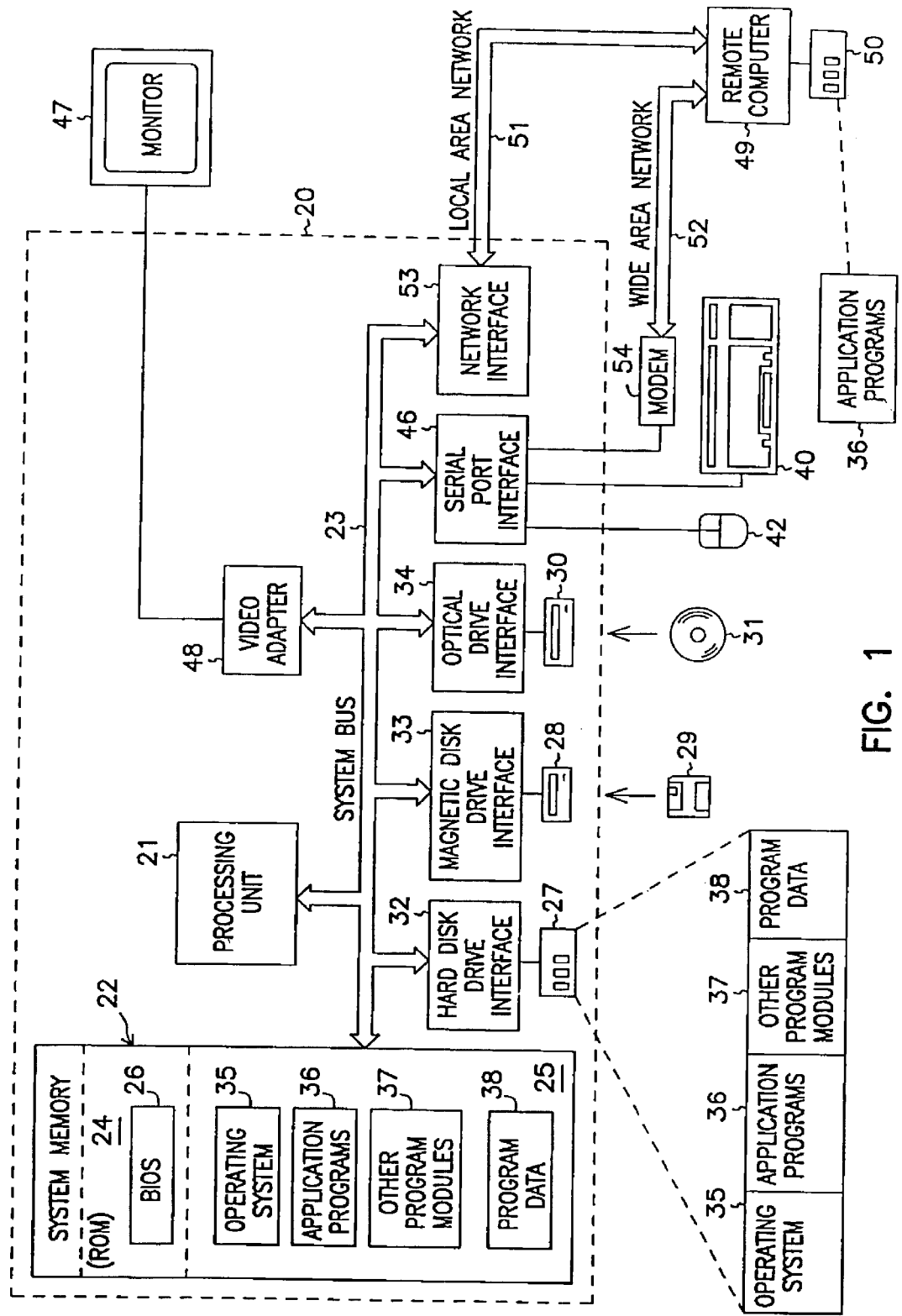
FIG. 1 shows a diagram of the hardware and operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System

Figure 2:
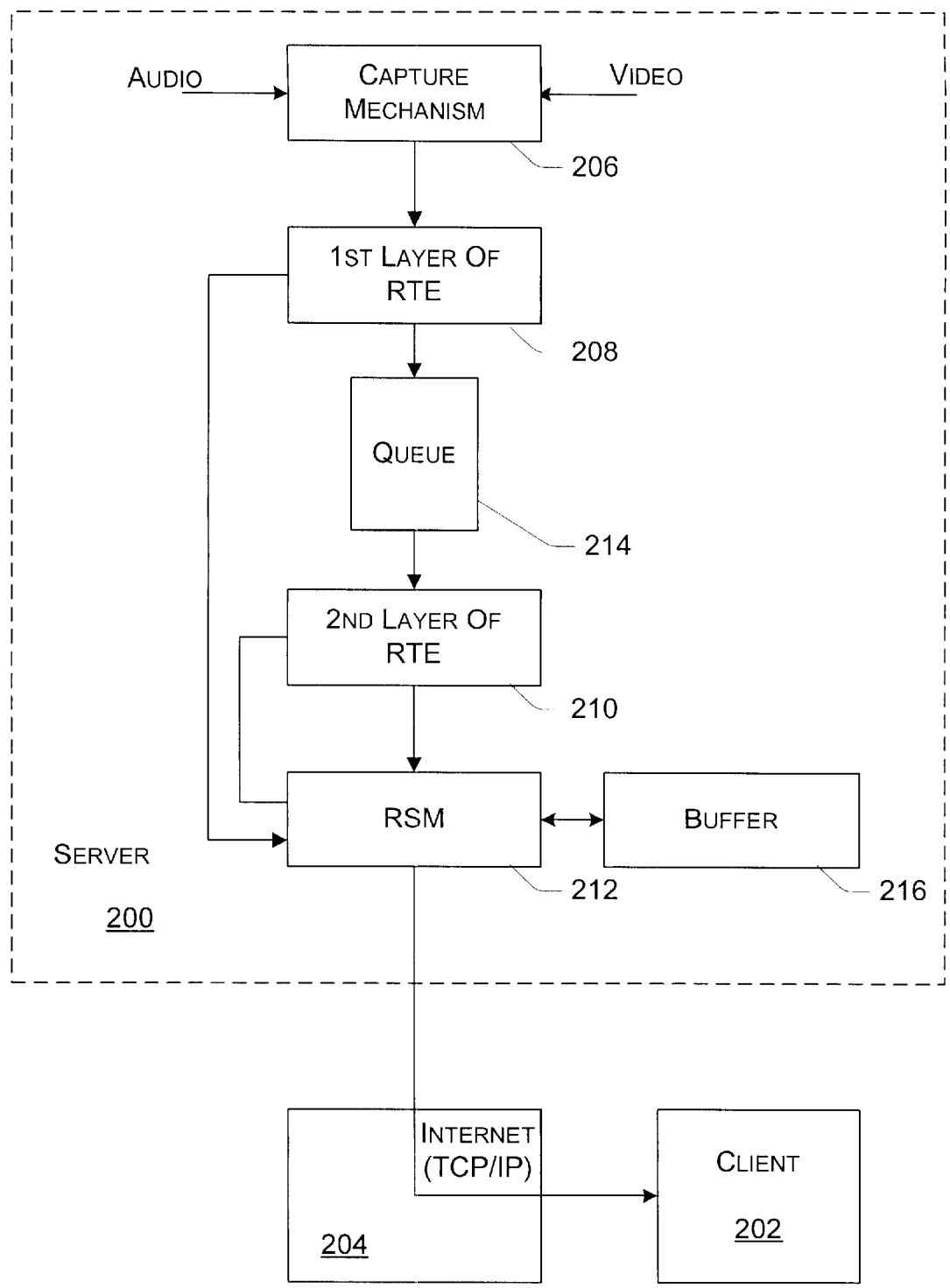
FIG. 2 shows a block diagram of a system according to one embodiment of the invention; and, FIG. 3 shows a flowchart illustrating a method according to one embodiment of the invention.

In this section of the detailed description, a description of a computerized system according to an embodiment of the invention is provided. The description is provided by reference to FIG. 2. Referring now to FIG. 2, a system according to an embodiment of the invention is shown. The system includes a server 200, a client 202, and the Internet 204. The server 200 is communicatively coupled to the client 202 via the Internet 204. The server 200 transmits to the client 202 a streams of packetized data. In one embodiment, such data relates to multimedia clips. As shown in FIG. 2, there is only one client 202, for sake of illustrative clarity. However, those of ordinary skill within the art can appreciate that the server 200 may communicate with a plurality of clients such as the client 202. Furthermore, the Internet 204 is one type of mechanism by which communication is provided via TCP/IP, as known within the art. The invention is not limited to a particular protocol, nor, in the case of TCP/IP, a particular mechanism such as the Internet 204.

The server 200 includes a capture mechanism 206, a first layer of a real-time encoder (RTE) 208, a second layer of the real-time encoder (RTE) 210, and a rate-smoothing mechanism 212. The capture mechanism 206 captures multimedia content such as audio and video, digitizing the content. The mechanism 206 may be made up of, in one embodiment, a number of hardware cards, such as a specific hardware card for audio, and a specific hardware card for video. The capture mechanism 206 sends data to the first layer 210 at an advertised rate. The advertised rate is a contract between the mechanism 206 and the first layer 210 to send data at the promised rate. However, the mechanism 206 may send data in bursts; the advertised rate is such that the average data rate over extended periods of time is the advertised rate. The first layer 210 may specify to the mechanism 206 the maximum rate at which data is to be sent (the arrival rate). The mechanism 206 sends the data it captures to the first layer of the real-time encoder 206.

The first layer of the real-time encoder 208 is in one embodiment designated as an upper layer of the real-time encoder, as known within the art. (The real-time encoder encodes the data as received from the capture mechanism 206 as packets for ultimate transmission to clients such as the client 202.) The first layer 208 receives the data from the mechanism 206, and packetizes the data, such that it places the data in a queue 214 for the reading thereof by the second layer of the real-time encoder 210. Corresponding to the arrival rate from the capture mechanism 206 to the first layer of the real-time encoder 208 is a (dynamic) bit rate of data sent from the first layer of the real-time encoder 208 to the second layer of the real-time encoder 210, through the queue 214. That is, the first layer 208 sends packets of data to the second layer 210 at a dynamic bit rate.

The second layer of the real-time encoder 210 is in one embodiment designated as a network layer of the real-time encoder, as known within the art. The second layer 210 is the part of the real-time encoder that, through the rate-smoothing mechanism 212, sends packets of data to clients such as the client 202. The second layer 210 is generally able to receive data from the first layer 208 at a predetermined maximum rate, which in one embodiment is measured as a percentage over the advertised bit rate of the capture mechanism 206. The first layer 208 is generally able to transmit data to the second layer 210 at the same rate at which the mechanism 206 sends data to the first layer 208. Thus, where the maximum rate at which the second layer 210 is able to receive data from the first layer 208 is less than the burst rate of the capture mechanism 206, there is a potential for data drop out to occur, such that the first layer 208 may send more data to the second layer 210 than the second layer 210 is able to receive.

To substantially prevent this situation from occurring, the rate-smoothing mechanism 212, operatively coupled to both the first layer 210 and the second layer 212, monitors the dynamic bit rate of transmission of data from the first layer 210 to the second layer 212. The rate-smoothing mechanism 212 dynamically adjusts this bit rate so that it is never greater than the predetermined maximum rate at which the second layer 210 is able to receive packets of data from the first layer 208. That is, the rate-smoothing mechanism 212 adjusts the dynamic bit rate at which the first layer 208 sends packets of data to the second layer 210 such that the rate is less than the predetermined maximum rate. In this manner, the maximum rate at which packets of data are sent from the first layer 208 to the second layer 210 is less than the burst rate of the capture mechanism 206; the second layer 210 is in one embodiment able to govern the capture mechanism 206 such that the mechanism 206 does not have a burst data rate greater than the predetermined maximum rate.

The rate-smoothing mechanism 212 further receives packets of data that are sent by the second layer of the real-time encoder 210, for transmission to the client 202 over the Internet 204. The client 202 in one embodiment may include a client proxy, as known within the art, that couples the client 202 to the rate-smoothing mechanism 212, over the Internet 204 (or via another TCP/IP connection). The client 202 in some instances may have a relatively limited throughput communications device, such as a modem that communicates only at 28,800, 33,600, or 53,000 bits-per-second (baud). This means that there is a potential for delays within the Internet 204 itself in transmitting the packets of data from the rate-smoothing mechanism 212 to the client 202 for causing the data received at the client 202 to be relatively out-of-date, since the throughput at the client 202 may not be able to make up for such delays. For example, where such data relates to a "late-breaking" news multimedia clip, delay in transmission to the client 202 for playback thereon may render the news less relevant to the user of the client 202.

To substantially prevent this problem, the rate-smoothing mechanism 212 temporarily stores the packets of data for transmission to the client 202 over the Internet 204 within a buffer 216, as the packets of data are received by the mechanism 212 from the second layer 210. The client thus receives the packets of data from the rate-smoothing mechanism 212 as they are temporarily stored in the buffer. The rate-smoothing mechanism 212 in one embodiment time stamps each packet of data temporarily stored in buffer 216 when it is placed therein. Furthermore, the mechanism 212 deletes packets from the buffer 216 when the packets temporarily stored therein exceed a predetermined backlog threshold, where such a backlog may result from transmission delays within the Internet 204 preventing the packets from timely reaching the client 202.

For example, in one embodiment, the mechanism 212 monitors the oldest packet (as measured by the time stamp) temporarily stored in the buffer 216; if this packet is older than the current system time of the server 200 by a predetermined length of time, then the mechanism 212 deletes packets from the buffer 216 so that the packets of data that are transmitted to the client 202 are not overly old, and thus may remain relevant and useful to the user of the client 202. This predetermined length of time may be measured by a number of minutes. The invention is not limited to the manner by which the mechanism 212 determines which packets to delete when the predetermined backlog threshold has been reached. In one embodiment, the mechanism 212 deletes fifty-percent of the packets, or in other words, every other packet in the buffer 216. Although this may result in more choppy playback of the captured multimedia clip on the client 202, it substantially ensures that the clip is being played back on the client 202 with a minimal amount of delay.

Thus, as has been described in conjunction with FIG. 2, embodiments of the invention provide for data-rate smoothing in two ways. First, packets sent from the first layer of a real-time encoder to the second layer of the real-time encoder are monitored such that their dynamic bit rate does not exceed a predetermined maximum rate. Second, packets sent from a server (specifically, the rate-smoothing mechanism thereof) to a client are monitored for age, and packets may be deleted if the oldest packet within a buffer of packets to be transmitted to the client is older than a predetermined length of time (i.e., a predetermined backlog threshold has been reached). Those of ordinary skill within the art can appreciate, however, that other applications and advantages of the invention also exist.

Method

In this section of the detailed description, a method according to an embodiment of the invention is presented. This description is provided in reference to FIG. 3. The computerized method is desirably realized at least in part as one or more programs running on a computer—that is, as a program executed from a computer-readable medium such as a memory by a processor of a computer. The programs are desirably storable on a computer-readable medium such as a floppy disk or a CD-ROM, for distribution and installation and execution on another (suitably equipped) computer. Thus, in one embodiment, a rate-smoothing program is executed by a processor of a server computer from a medium therefrom to adjust the dynamic bit rate of data sent by an upper layer of a real-time encoder to a network layer, such that the rate is less than a predetermined maximum rate. In another embodiment, the rate-smoothing program further is to buffer packets of data sent by the network layer, and delete at least one packet of data when the packets as buffered exceed a predetermined backlog threshold.

Figure 3:
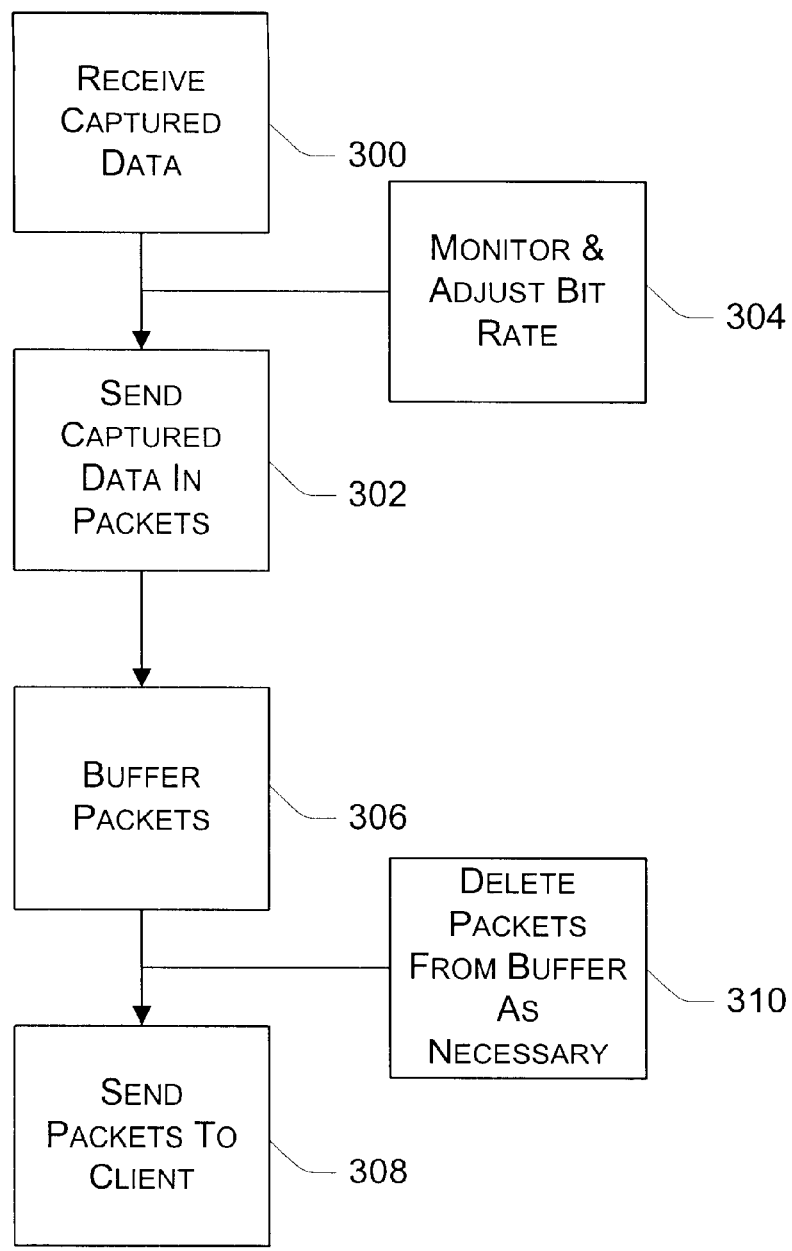

Referring now to FIG. 3, a flowchart of a method according to one embodiment of the invention is shown. In 300, captured data is received, for example, by an upper layer of a real-time encoder that is part of a server computer. The captured data in one embodiment relates to multimedia content, such as audio and/or video content. Thus, such data is captured, and then received in 300. In 302, the captured data is packetized into packets of data, and sent, for example, from the upper layer of the real-time encoder to a network layer of the real-time encoder. The data is sent at a dynamic bit rate. Sending the packets of data may include queuing the packets of data for reading by, for example, the network layer of the real-time encoder.

To ensure that the data as sent in packets in 302 does not exceed a maximum rate at which the packets can be received (that is, the dynamic bit rate does not exceed the maximum rate), in 304 the dynamic bit rate of the transmission of packets in 302 is monitored and adjusted such that the rate is less than a predetermined maximum rate. In one embodiment, this adjustment may result in decreasing the rate at which captured data is received in 300. In the same or another embodiment, adjusting the dynamic bit rate is accomplished by measuring the arrival of the packets of data as they are sent in 302 for each of a series of predetermined periods of time. In this way, the dynamic bit rate over each period of time can be monitored, to determine if it is exceeding the predetermined maximum rate, such that adjustment thereto is necessary (so that the dynamic bit rate should be lower as measured in the next period of time). The predetermined maximum rate is in the same or another embodiment a predetermined percentage over an advertised arrival bit rate at which captured data is received in 300.

In 306, the packets of data sent in 302 are buffered, and in 308, sent to a client computer (as buffered) that may be coupled to the server computer via the Internet or another TCP/IP connection. In one embodiment, the packets of data as buffered are sent to the client computer in 308 via a client proxy, as known within the art. In 310, the packets of data buffered in 306 are monitored, to ensure that a predetermined backlog threshold is not being exceeded as the buffered packets are sent to the client computer in 308. That is, in 310, the packets of data are monitored to determined whether there the packets are "backed up" while waiting to be transmitted to the client in 308.

Where the predetermined backlog threshold has been exceeded, at least one packet of data is deleted from the buffer in 310, such that these packets are not sent to the client in 308. In one embodiment, the packets picked for deletion are a predetermined percentage of the packets in the buffer, such as fifty percent, or every other packet in the buffer. The predetermined backlog threshold may be determined by time stamping the packets as they are buffered in 306, and determining whether the oldest buffered packet (as time stamped) is older than the current time by a predetermined length of time, as may be measured in minutes (for example, five minutes).

A method according to an embodiment of the invention has been described. The invention according to this embodiment provides for rate smoothing of transmission of packets of data in two ways. First, the bit rate of captured data as sent in packets is monitored so that it does not exceed a predetermined maximum rate, such that drop out is substantially prevented. Second, buffered packets for transmission to a client may be periodically deleted when a predetermined backlog threshold has been reached, such that transmission delays in sending the packets to the client do not substantially cause the packets that do ultimately reach the client to be overly old, and thus potentially less useful to a user of the client.

Conclusion

Data rate smoothing has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

I claim:

1. A system comprising:
   a real-time encoder having a first layer and a second layer, where the first layer is to send packets of data to the second layer at a dynamic bit rate; and,
   a rate-smoothing mechanism to adjust the dynamic bit rate at which the first layer of the real-time encoder is to send the packets of data to the second layer such that the rate is less than a predetermined maximum rate.

2. The system of claim 1, wherein the second layer of the real-time encoder is to send the packets of the data to the rate-smoothing mechanism, and the system further comprises:
   a buffer to temporarily store the packets of the data received by the rate-smoothing mechanism from the second layer of the real-time encoder; and, a client to receive the packets of the data from the rate-smoothing mechanism as temporarily stored in the buffer, such that the rate-smoothing mechanism deletes packets from the buffer when the packets temporarily stored therein exceed a predetermined backlog threshold.

3. The system of claim 1, wherein the first layer of the real-time encoder comprises an upper layer of the real-time encoder coupled to a capture mechanism capturing audio and video content.

4. The system of claim 3, wherein the capture mechanism comprises at least one audio capture hardware card and at least one video capture hardware card.

5. The system of claim 1, wherein the second layer of the real-time encoder comprises a network layer of the real-time encoder, and the system further comprises a queue coupling the first layer of the real-time encoder to the second layer of the real-time encoder.

6. The system of claim 2, further comprising a client proxy coupling the client to the rate-smoothing mechanism.

7. The system of claim 2, wherein the client is coupled to the rate-smoothing mechanism via the Internet.

8. The system of claim 2, wherein client is coupled to the rate-smoothing mechanism via TCP/IP.

9. The system of claim 3, wherein the predetermined maximum rate is a predetermined percentage over an advertised arrival bit rate to the first layer of the real-time encoder from the capture mechanism.

10. The system of claim 2, wherein the predetermined backlog threshold is determined as an oldest packet temporarily stored in the buffer being older than the current time by a predetermined length of time.

11. A method comprising:

sending captured data as packets of data at a dynamic bit rate;

adjusting the dynamic bit rate at which the packets of data are sent such that the rate is less than a predetermined maximum rate;

buffering the packets of data;

deleting at least one packet of data when the packets as buffered exceed a predetermined backlog threshold; and, sending the packets of data as buffered to a client.

12. The method of claim 11, wherein sending captured data as packets of data comprises:

capturing the data; and, receiving the captured data.

13. The method of claim 11, wherein sending captured data as packets of data comprises queuing the packets of data.

14. The method of claim 11, wherein adjusting the dynamic bit rate comprises measuring arrival of the packets of data as the packets are sent for each of a series of predetermined periods of time.

15. The method of claim 11, wherein deleting at least one packet of data comprises deleting a predetermined percentage of the packets of data.

16. The method of claim 11, wherein sending the packets of data as buffered to a client comprises sending the packets of data to the client via a client proxy.

17. The method of claim 11, wherein the predetermined maximum rate is a predetermined percentage over an advertised arrival bit rate.

18. The method of claim 11, wherein the predetermined backlog threshold is determined as an oldest buffered packet being older than the current time by a predetermined length of time.

19. A computer comprising:

a real-time encoder having an upper layer and a network layer, where the upper layer is to send packets of data to the network layer at a dynamic bit rate;

a processor;

a computer-readable medium; and, a rate-smoothing program executed by the processor from the medium to adjust the dynamic bit rate such that the rate is less than a predetermined maximum rate.

20. The computer of claim 19, wherein the predetermined maximum rate is a predetermined percentage over an advertised arrival bit rate.

21. The computer of claim 19, wherein the rate-smoothing program further is to buffer the packets of data and delete at least one packet of data when the packets as buffered exceed a predetermined backlog threshold.

22. The computer of claim 21, wherein the predetermined backlog threshold is determined as an oldest buffered packet being older than the current time be a predetermined length of time.

23. A computer-readable medium having a computer program stored thereon for execution on a computer having a real-time encoder having an upper layer and a network layer, where the upper layer is to send packets of data to the network layer at a dynamic bit rate, and where the program is to adjust the dynamic bit rate such that the rate is less than a predetermined maximum rate.

24. The computer readable medium of claim 23, wherein the predetermined maximum rate is a predetermined percentage over an advertised arrival bit rate.

25. The computer-readable medium of claim 23, wherein the program further is to buffer the packets of data and delete at least one packet of data when the packets as buffered exceed a predetermined backlog threshold.

26. The computer-readable medium of claim 25, wherein the predetermined backlog threshold is determined as an oldest buffered packet being older than the current time be a predetermined length of time.

* * * * *